Patented Mar. 6, 1945

2,371,093

UNITED STATES PATENT OFFICE 2,371,093

METHOD OF MAKING COFFEE TABLETS

Walter W. Willison, Chicago, Ill.

No Drawing. Application August 13, 1943,
Serial No. 498,593

2 Claims. (Cl. 99—66)

There has long existed a demand for coffee packaged in small units each adapted to make one cup of coffee, and various ways have heretofore been suggested to accomplish this. However, because of the peculiar nature of the coffee bean and of the extreme difficulty of preserving in the same a substantial degree of freshness, particularly after it is ground, there has heretofore been no commercially successful solution of the problem.

The object of the present invention is to make it possible commercially to distribute coffee in small units at a low cost for the coffee itself, without employing containers that are expensive or require costly or time-taking operations in packaging the units, and without requiring the user to be inconveniently careful in order to prevent deterioration of unused coffee once a package of small units has been opened.

As in Patent No. 1,535,233, with respect to which I was one of the applicants, I put the coffee into tablet form. However, instead of compressing a number of whole beans to form a tablet, I first grind the beans. Mere grinding is not enough to overcome the faults of the old product and the process of making it. For example, very heavy pressure is required to break the cells so that the air may escape and, where a mass of steel cut grains is compressed in a mold, the crushing is not uniform throughout the mass; the sugars, oils and waxes are not released sufficiently to secure good bonding of the particles; and there is no interlocking of the grains or particles so tie them together mechanically. The result is that heavy, costly machinery is needed to mold masses of steel cut particles into tablets; the combined crushing and molding process must be carried out slowly to enable air from ruptured interior cells to escape; and the tablets themselves are weak and crumbly. Since the interior grains or particles in such a tablet may be little changed from their original state, the rate of release of the sugars, oils and waxes is not the same for all particles when a tablet is broken up in the process of brewing a cup of coffee. For that reason, two cups of coffee brewed in the same way from tablets out of the same package may taste quite differently from each other. Also, because of the fragility of the tablets, it is not easy to package them or to guard against breakage and consequent deterioration prior to using them.

In accordance with my invention, after roasting the coffee beans and grinding them to any desired degree of fineness, I pass the grains or particles between pressure rolls which, through the expenditure of only a little power, thoroughly crush them and roll them flat into thin flakes; all of the occluded air being dissipated in this operation. When a measured quantity of these flakes is placed in a mold, by flowing directly into the same from the crushing rolls, if desired, they lie flat to a considerable extent and, like the scales of a fish, overlap each other. Consequently, when the loose mass is pressed down by means of a plunger or the like, portions of many flakes are gripped between other flakes and the whole mass is mechanically tied together to a greater or lesser extent. For this reason the tablets are not as brittle and possess greater capacity to resist disintegrating forces than do tablets molded from whole beans or ordinary steel cut grains or particles.

It will be seen that, because the crushing of the cells is done by the pressure rolls, all that need be done in the final operation is to compact the loose masses into tablet form. This last step requires very little power compared to that which is needed to crush and simultaneously to mold whole beans or ordinary steel cut grains. Therefore my process saves power. Also, because the molding process is not slowed down in order to give the air in the coffee material, as is the case with whole beans and ordinary steel cut grains or particles, time to escape, this step may be an instantaneous one; thereby effecting a great saving of time and a further lowering of the cost of manufacturing the tablets.

My new tablets are also quite different in other respects from those previously made. They are harder and denser than those composed of whole beans or steel cut bean fragments. Because they are harder, they are more compact and, therefore, smaller than prior tablets of the same weight; so that a pound of my tablets, for example, takes up less shipping and storage space than does a pound of any other kind of coffee. There is also a more effective or truer bonding of the individual particles to each other than in any other tables containing no extraneous bonding material; this being due to the fact that the flakelike particles have broad faces in contact with each other and to the further fact that the preliminary flaking has brought the sugars, oils and waxes right to those faces and ready to exude under a light molding pressure.

Notwithstanding the hard and sturdy character of my tablets, they immediately break up on contact with water and release the oils and other soluble constituents so that a brew of exceptionally strong coffee flavor is quickly made.

A further substantial saving is made possible through the elimination of costly containers and special packing processes now commonly employed to preserve coffee. My tablets may be placed in a cheap paper carton, each individual tablet or small group of tablets being wrapped in waxed paper or the like. As long as a tablet remains in its wrapper, it retains its freshness, so that the opening of a carton does not expose the coffee to conditions causing it to deteriorate. In other words, the carton may remain open and the coffee will remain fresh until used, as long as the wrapper about a tablet is not broken until it is to be used.

I claim:

1. The method of making strong, hard coffee tablets, which consists in roasting coffee beans, dividing them into small grains or particles, passing such grains or particles through pressure apparatus to crush and flatten the same, and then compressing predetermined quantities of the crushed and flattened particles into tablets.

2. The method of making strong, hard coffee tablets, which consists in roasting coffee beans, dividing them into small grains or particles, passing the latter between pressure rollers to crush the same and flatten them until they are very thin compared with their lengths and widths, flowing a predetermined quantity of the crushed particles into a mold wherein many of them will lie with their faces in parallel planes and in overlapping relation to each other, and applying pressure to compact and solidify the mass.

WALTER W. WILLISON.